Feb. 17, 1959  J. S. YAGER  2,873,807
COTTON AND CORN CHOPPER
Filed May 24, 1956  3 Sheets-Sheet 1

Joseph S. Yager
INVENTOR.

BY
Attorneys

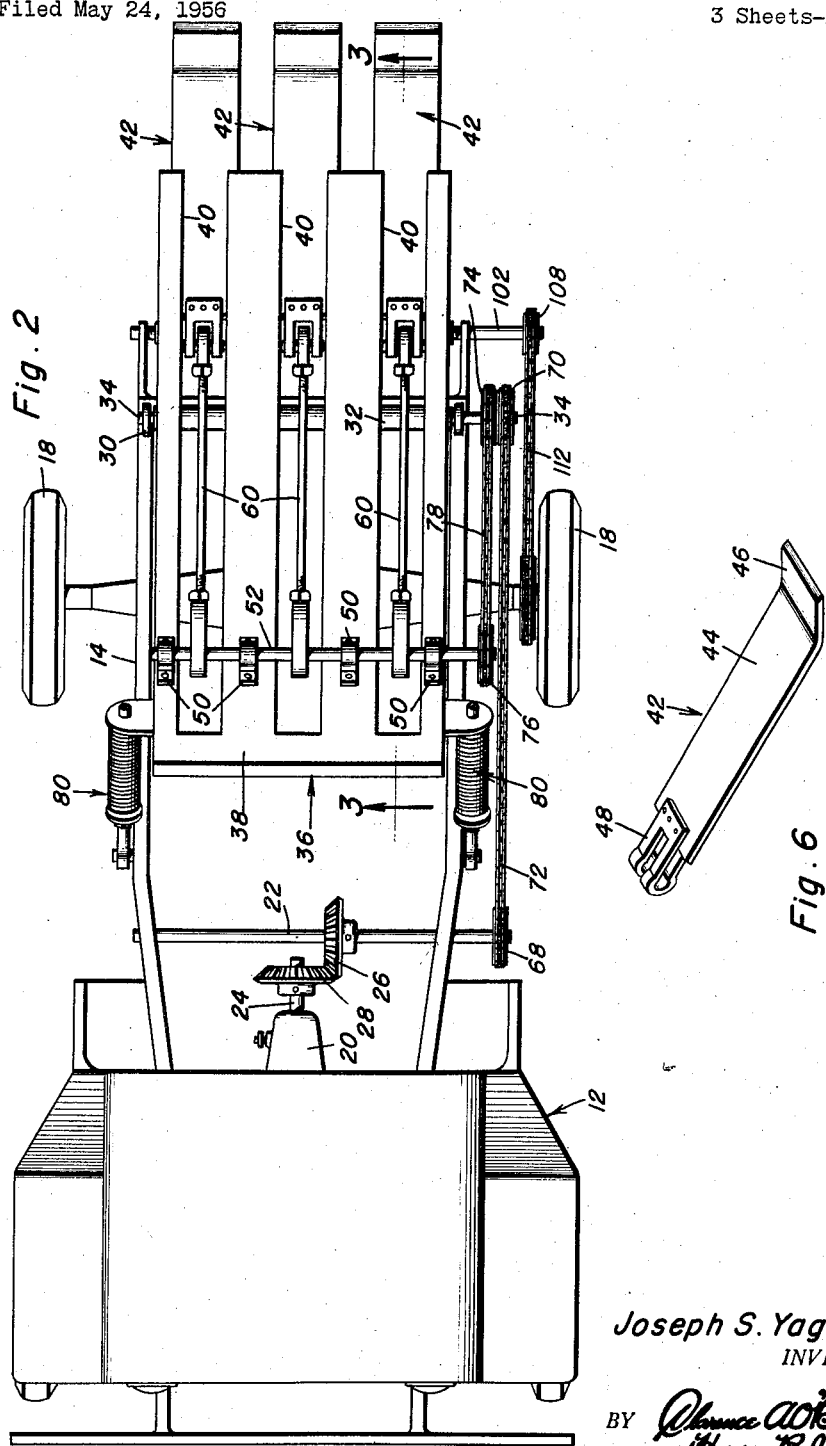

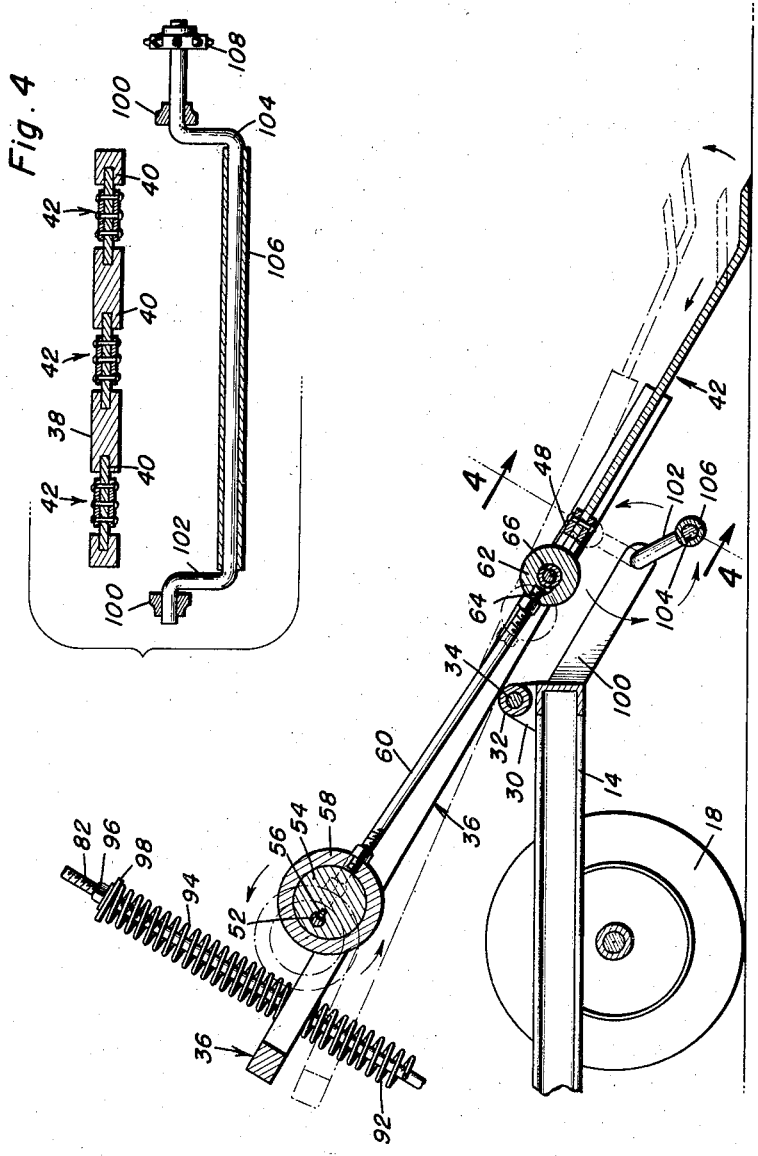

United States Patent Office 2,873,807
Patented Feb. 17, 1959

2,873,807

COTTON AND CORN CHOPPER

Joseph S. Yager, Greenville, Miss.

Application May 24, 1956, Serial No. 587,142

6 Claims. (Cl. 172—88)

This invention relates in general to new and useful improvements in agricultural implements, and more specifically to an improved cotton and corn chopper.

When certain crops are planted, particularly cotton, it is necessary that at an early stage in the growth of the plants they be thinned. Therefore, in order that the plants may be thinned it is necessary that a large percentage of the originally planted plants be chopped out. In order to properly accomplish this, it is necessary that one either take a hoe and by eye chop out the undesired plant, or that there be provided suitable machines for accomplishing the chopping operation. It is therefore the primary object of this invention to provide an improved cotton and corn chopper which is so constructed whereby it may be run down the rows of small plants and will periodically chop from the individual rows those plants which must be removed in order that the plants may be thinned in order to obtain a maximum crop.

Another object of this invention is to provide an improved chopper for cotton and corn, the chopper being in the form of a self-propelled vehicle which carries a suitable carriage supporting at least one chopping member, the carriage being mounted for pivotal movement and there being carried by the vehicle tilting means which will sequentially tilt the carriage and move the chopper member out of engagement with the ground, the tilting means being driven by one of the wheels of the vehicle whereby the tilting of the carriage is timed with the particular movement of the vehicle.

Another object of this invention is to provide an improved chopper for cotton and corn, the chopper including a pluarlity of chopper members which are so mounted whereby they will ride over the ground during a chopping operation irrespective of the particular contour of the ground.

A further object of this invention is to provide an improved cotton and corn chopper which is mounted on a self-propelled vehicle and which is driven by such vehicle whereby it is merely necessary to drive the vehicle down the rows of corn or cotton to be chopped and the operation of the corn and cotton chopper will be automatic.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the cotton and corn chopper with portions thereof being broken away for purposes of clarity;

Figure 3 is an enlarged fragmentary sectional view taken substantially upon the plane indicated by the section line 3—3 of Figure 2 and shows the specific details of the mounting of a chopper member and the manner in which it is operated to perform a chopping operation, alternative positions of the chopper member being shown in broken lines;

Figure 4 is an enlarged fragmentary sectional view taken substantially upon the plane indicated by the section line 4—4 of Figure 3 and shows the details of the tilting means;

Figure 6 is a perspective view of one of the chopper members and shows the general details thereof.

Figure 1:
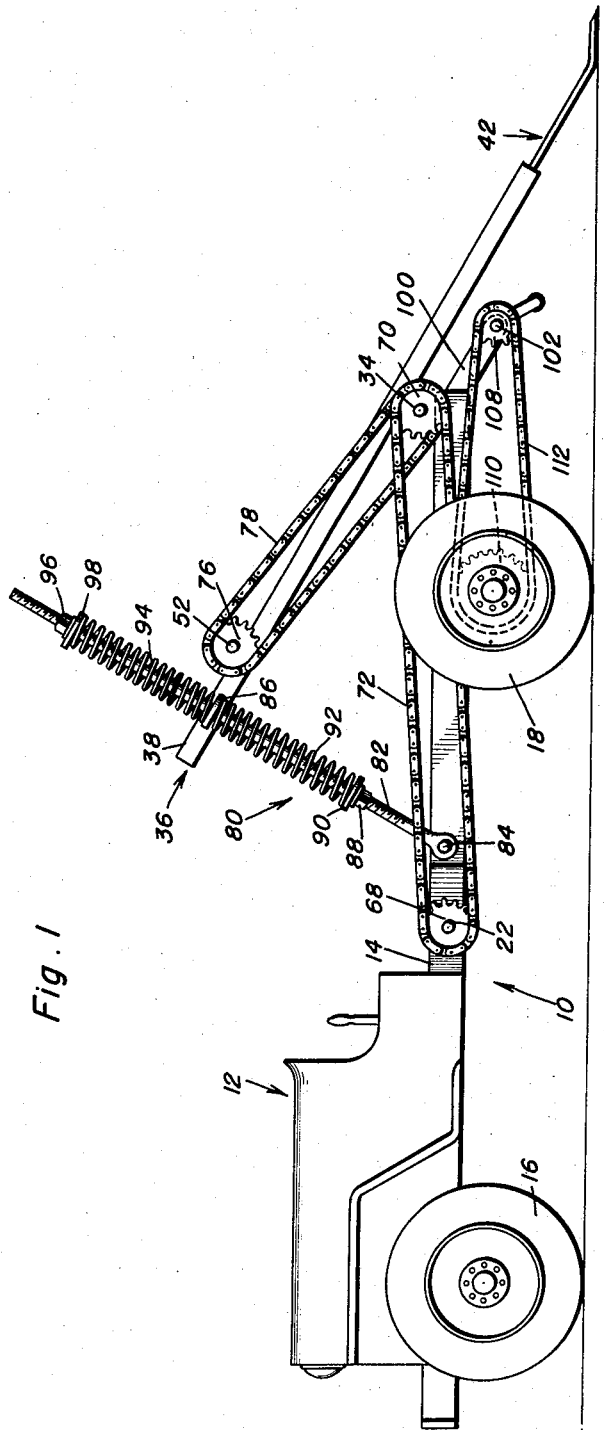
Figure 1 is a side elevational view of the cotton and corn chopper which is the subject of this invention and shows the general details thereof.
Figure 5:
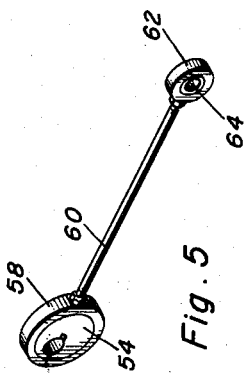
Figure 5 is an enlarged perspective view of the means for effecting reciprocation of one of the chopper members.

Referring now to the drawings in detail, it will be seen that there is illustrated the cotton and corn chopper which is the subject of this invention, the chopper being referred to in general by the reference numeral 10. The chopper 10 includes a self-propelled vehicle which is referred to in general by the reference numeral 12. The self-propelled vehicle 12 is preferably of the four wheel drive type, such as the conventional Jeep, and includes a frame 14 supported by wheels 16 and 18. The wheels 16 are the normal front wheels of the vehicle 12 whereas the wheels 18 are the normal rear wheels. The vehicle 12 also includes an engine (not shown) which is connected to a transmission 20 having a cross shaft 22 connected to a main shaft 24, the shafts 22 and 24 being connected by meshing bevel gears 26 and 28. It is to be understood that the various details of the shafts and gears are shown generally schematically for the purpose of clarity with respect to this invention.

Extending upwardly from the frame 14 at the rear end thereof on opposite sides thereof are mounting bearings 30 which carry a transverse shaft 34. Rotatably mounted on the shaft 34 is a sleeve 32 which supports for pivotal movement a bracket assembly which is referred to in general by the reference numeral 36. The bracket assembly 36 includes primarily a frame 38 having a plurality of longitudinally extending guideways 40 formed therein. The details of the guideways 40 are best illustrated in Figure 4.

Mounted in each of the guideways 40 is a longitudinally extending chopper member which is referred to in general by the reference numeral 42. As is best illustrated in Figure 6, each chopper member 42 includes an elongated body portion 44 which terminates at its lower end in a ground engaging blade 46. Secured to the upper end of the body portion 44 is a yoke 48.

Extending transversely of the frame 38 and journaled in pillow blocks 50 carried thereby is a drive shaft 52. Carried by the drive shaft 52 in alignment with each of the chopper members 42 is an eccentrically mounted throw 54, the throw 54 being keyed to the drive shaft 52 by means of a key 56. Mounted on each throw 54 is an annular follower 58 which has adjustably connected thereto a connecting rod 60. The opposite end of the connecting rod 60 is connected to a connecting fitting 62 which is provided with a suitable bearing 64. Disposed within the bearing 64 is a connecting pin 66 which is carried by the yoke 48.

Carried by the cross shaft 22 is a drive sprocket 68 which is aligned with an idler sprocket 70 mounted on an outwardly extending portion of the shaft 34. Entrained over the sprockets 68 and 70 and connecting the two together is a drive chain 72.

The sprocket 70 is connected to a sprocket 74 also mounted on the shaft 34. The sprocket 74 is aligned with a sprocket 76 which is secured to the shaft 52. Entrained over and drivingly connecting the sprockets 74 and 76 is a drive chain 78. Thus the drive shaft 52 may be selectively driven.

Because of the particular connection between the drive shaft 52 and each of the chopper members 42, it will be readily apparent that when the drive shaft 52 is driven, the chopper members 42 will reciprocate in the bracket assembly 36 in the manner best illustrated in broken lines in Figure 3.

In order that the blade portion 46 of each of the chopper members 42 may be retained in engagement with the ground and also returned to a normal ground engaging position, there is carried by the frame 14 positioning means which are referred to in general by the reference numeral 80. The positioning means 80 includes an elongated threaded shaft 82 secured to each side of the frame 14 by means of a pivot bolt 84. Secured to opposite sides of the frame 38 and extending outwardly therefrom are ears 86 through which pass an intermediate portion of an associated one of the shafts 82. Mounted on the lower part of each shaft 82 is an adjustable nut 88 and an abutting washer 90. Abutting the washer 90 is the lower end of a lower spring 92 whose upper end engages the underside of the ear 86. A similar spring 94 is mounted on the upper part of the shaft 82 with the lower end thereof in engagement with the upper side of the ear 86. An adjusting nut 96 and an abutting washer 98 engage the upper end of the spring 94 to facilitate the positioning thereof. By adjusting the nuts 88 and 96, the position of the bracket assembly 36 may be varied as desired to assure proper engagement of the chopper members 42 with the ground at the desired time.

Extending rearwardly from the frame 14 at the rear corners thereof are depending brackets 100. Extending transversely between the lower ends of the brackets 100 and suitably journaled therein is a shaft 102. The shaft 102 is of the crank type and includes an offset 104 on which there is mounted a suitable roller 106. The shaft 102 extends transversely of the bracket assembly 36 and underlies it. When the shaft 102 is rotated, the roller 106 becomes engaged with the underside of the frame 38 and effects the lifting thereof whereby the bracket assembly 36 and the chopper members 42 carried thereby are pivoted from the solid line position of Figure 3 to the extended broken line position of the same figure.

In order to facilitate driving of the shaft 102, one end thereof is extended and has mounted thereon a sprocket 108. The sprocket 108 is aligned with a sprocket 110 secured to one of the wheels 18. The sprockets 108—110 are aligned and are drivingly connected together by a drive chain 112.

Inasmuch as the shaft 102 is driven directly from one of the wheels 18, it will be seen that the tilting of the carriage assembly 36 is timed with respect to the distance traveled by the chopper 10. Thus a chopping operation will be effected at a predetermined interval.

It is to be understood that the chopper members 42 are spaced in accordance with the row spacing of the cotton or corn to be chopped. Thus if the vehicle 12 is properly steered, the chopper members 42 will be aligned with certain rows of corn or cotton. It is to be understood that the chopper members 42 must be disposed foremost in the normal chopping operation. Thus the vehicle 12 must be driven to the rear or reverse so that the wheels 18 actually move in advance of the wheels 16. As the vehicle 12 moves down the rows of cotton or corn, the chopper members 42 will periodically be elevated at which time plants chopped thereby will be lifted out of engagement with the ground. During the time the chopper members 42 are elevated, the plants will not be chopped and thus those plants remaining will be at the desired intervals.

Although the particular cotton and corn chopper described and illustrated is intended for use in a chopping operation extending down rows of plants, the same general structure may be used in conjunction with a chopping operation transversely of the rows. In order to adapt the chopper 10 to such an operation, the drive for the shaft 102 will be eliminated and a different type of bracket assembly and chopper members will be used. The chopper members will be narrower and be more closely spaced together with the spacing therebetween being equal to that desired by the farmer. The chopper members 42 will not be lifted out of engagement with the ground, but will be resiliently held in position by the positioning means 80. However, the chopper members 42 may be reciprocated, if desired, to facilitate the chopping operation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cotton and corn chopper comprising a frame having supporting means, a bracket assembly mounted on said frame for pivoting about a transverse horizontal axis, at least one longitudinally extending chopper member carried by said bracket assembly for longitudinal sliding movement, drive means mounted on said bracket assembly and connected to said chopper member for reciprocating said chopper member, tilting means carried by said frame and engaged with said bracket assembly for periodically pivoting said bracket assembly to raise and lower said chopper member, positioning means carried by said frame for adjustably retaining said bracket assembly in a normal position, said positioning means including a shaft pivotally connected to said frame and passing through a portion of said bracket assembly, upper and lower springs on said shaft disposed above and below said bracket assembly and engaged therewith, means on said shaft for adjustably positioning said springs.

2. A cotton and corn chopper adapted to be affixed to a vehicle comprising a vehicle frame having supporting means including wheels, a bracket assembly mounted on said frame for pivoting about a transverse horizontal axis comprising primarily a frame, said frame having at least one longitudinally extending guideway therein, at least one longitudinally extending chopper member corresponding in number and size to the longitudinal extending guideway, said chopper member being carried in said longitudinal guideway for longitudinal sliding movement, drive means mounted on said bracket assembly and connected to said longitudinally extending chopper member for reciprocating said chopper member with a longitudinally sliding movement in said longitudinally extending guideway, said vehicle frame including a second bracket assembly, tilting means comprising a rotating crank journaled in said second bracket assembly and having an elongated offset portion extending transversely of and underlying and engaging said first mentioned bracket assembly for periodically pivoting said bracket assembly to raise and lower said chopper member.

3. A cotton and corn chopper adapted to be affixed to a vehicle comprising a vehicle frame having supporting means including wheels, a bracket assembly mounted on said frame for pivoting about a transverse horizontal axis comprising primarily a frame, said frame having at least one longitudinally extending guideway therein, at least one longitudinally extending chopper member corresponding in number and size to the longitudinal extending guideway, said chopper member being carried in said longitudinal guideway for longitudinal sliding movement, drive means mounted on said bracket assembly and connected to said longitudinally extending chopper member for reciprocating said chopper member with a longitudinally sliding movement in said longitudinally extending guideway, said vehicle frame including a second bracket assembly, tilting means comprising a rotating crank journaled in said second bracket assembly and having an elongated offset portion extending transversely of and underlying and engaging said first mentioned bracket assembly for periodically pivoting said bracket assembly to raise and lower said chopper member, positioning means carried by said vehicle frame for adjustably retaining said bracket assembly in a normal position.

4. A cotton and corn chopper adapted to be affixed to a vehicle comprising a vehicle frame having supporting means including wheels, a bracket assembly mounted on said frame for pivoting about a transverse horizontal axis comprising primarily a frame, said frame having at least one longitudinally extending guideway therein, at least one longitudinally extending chopper member corresponding in number and size to the longitudinal extending guideway, said chopper member being carried in said longitudinal guideway for longitudinal sliding movement, drive means mounted on said bracket assembly and connected to said longitudinally extending chopper member for reciprocating said chopper member with a longitudinally sliding movement in said longitudinally extending guideway, said vehicle frame including a second bracket assembly, tilting means comprising a rotating crank journaled in said second bracket assembly and having an elongated offset portion extending transversely of and underlying and engaging said first mentioned bracket assembly for periodically pivoting said bracket assembly to raise and lower said chopper member, positioning means carried by said vehicle frame for adjustably retaining said bracket assembly in a normal position, said positioning means including a shaft pivotally connected to said vehicle frame and passing through a portion of said bracket assembly.

5. A cotton and corn chopper adapted to be affixed to a vehicle comprising a vehicle frame having supporting means including wheels, a bracket assembly mounted on said frame for pivoting about a transverse horizontal axis comprising primarily a frame, said frame having at least one longitudinally extending guideway therein, at least one longitudinally extending chopper member corresponding in number and size to the longitudinal extending guideway, said chopper member being carried in said longitudinal guideway for longitudinal sliding movement, drive means mounted on said bracket assembly and connected to said longitudinally extending chopper member for reciprocating said chopper member with a longitudinally sliding movement in said longitudinally extending guideway, said vehicle frame including a second bracket assembly, tilting means comprising a rotating crank journaled in said second bracket assembly and having an elongated offset portion extending transversely of and underlying and engaging said first mentioned bracket assembly for periodically pivoting said bracket assembly to raise and lower said chopper member, positioning means carried by said vehicle frame for adjustably retaining said bracket assembly in a normal position, said positioning means including a shaft pivotally connected to said vehicle frame and passing through a portion of said bracket assembly, upper and lower springs on said shaft disposed above and below said bracket assembly and engaged therewith, means on said shaft for adjustably positioning said springs.

6. A cotton and corn chopper adapted to be affixed to a vehicle comprising a vehicle frame having supporting means including wheels, a bracket assembly mounted on said frame for pivoting about a transverse horizontal axis comprising primarily a frame, said frame having at least one longitudinally extending guideway therein, at least one longitudinally extending chopper member corresponding in number and size to the longitudinal extending guideway, said chopper member being carried in said longitudinal guideway for longitudinal sliding movement, drive means mounted on said bracket assembly and connected to said longitudinally extending chopper member for reciprocating said chopper member with a longitudinally sliding movement in said longitudinally extending guideway, said vehicle frame including a second bracket assembly, tilting means comprising a rotating crank journaled in said second bracket assembly and having an elongated offset portion extending transversely of and underlying and engaging said first mentioned bracket assembly for periodically pivoting said bracket assembly to raise and lower said chopper member, positioning means carried by said vehicle frame for adjustably retaining said bracket assembly in a normal position, said positioning means including a shaft pivotally connected to said vehicle frame and passing through a portion of said bracket assembly, upper and lower springs on said shaft disposed above and below said bracket and engaged therewith, means on said shaft for adjustably positioning said springs during a part of the tilting means cycle said bracket assembly being caused to pivot about a shaft mounted on said vehicle frame causing the forward portion of said bracket assembly to be raised off the ground and the rearward portion of said bracket assembly to be lowered against the action of said lower spring.

References Cited in the file of this patent

UNITED STATES PATENTS

| | | |
|---|---|---|
| 1,609,231 | Webb | Nov. 30, 1926 |
| 2,252,593 | Bruene | Aug. 12, 1941 |